(12) United States Patent
Kim

(10) Patent No.: US 7,959,712 B2
(45) Date of Patent: Jun. 14, 2011

(54) CONTINUOUS CONCENTRATION SYSTEM AND METHOD FOR VOLATILE ORGANIC COMPOUNDS USING MOVING-BED REACTOR

(75) Inventor: Sang-guk Kim, Daejeon (KR)

(73) Assignee: Korea Institute of Energy Research (KR)

( * ) Notice: Subject to any disclaimer, the term of this patent is extended or adjusted under 35 U.S.C. 154(b) by 294 days.

(21) Appl. No.: 12/323,665

(22) Filed: Nov. 26, 2008

(65) Prior Publication Data

US 2009/0188387 A1 Jul. 30, 2009

(30) Foreign Application Priority Data

Jan. 29, 2008 (KR) ........................ 10-2008-0008832

(51) Int. Cl.
*B01D 53/06* (2006.01)
(52) U.S. Cl. ............................... 95/107; 96/143; 96/150
(58) Field of Classification Search .................... 96/115, 96/121, 123, 125, 143, 150; 95/107
See application file for complete search history.

(56) References Cited

U.S. PATENT DOCUMENTS

| | | | | |
|---|---|---|---|---|
| 5,169,414 A * | 12/1992 | Panzica et al. | .................. | 95/113 |
| 5,242,473 A * | 9/1993 | Ogasahara | ....................... | 96/125 |
| 5,667,560 A * | 9/1997 | Dunne | ............................ | 95/113 |
| 5,702,508 A * | 12/1997 | Moratalla | ....................... | 96/118 |
| 6,010,562 A * | 1/2000 | Flynn et al. | ...................... | 96/125 |
| 6,099,623 A * | 8/2000 | Namatame et al. | ............. | 96/125 |
| 6,165,254 A * | 12/2000 | Kawakami et al. | ............. | 96/125 |
| 6,294,000 B1 * | 9/2001 | Klobucar | ....................... | 95/113 |
| 7,601,206 B2 * | 10/2009 | Call et al. | ........................ | 96/125 |
| 7,789,942 B2 * | 9/2010 | Vanderstraeten et al. | ...... | 95/113 |
| 2002/0035923 A1 * | 3/2002 | Fukuhori et al. | ............... | 95/113 |
| 2005/0172805 A1 * | 8/2005 | Motono et al. | .................. | 95/113 |

* cited by examiner

*Primary Examiner* — Frank M Lawrence
(74) *Attorney, Agent, or Firm* — Cantor Colburn LLP

(57) ABSTRACT

A continuous concentration system for volatile organic compounds for concentrating volatile organic compounds that undergo an absorption process and a removal process includes: a moving-bed chamber in which modules for absorbing volatile organic compounds are absorbed. An absorption bed line to which the volatile organic compounds are supplied to be absorbed to the module is provided on one side of the moving-bed chamber. A removal-cooling bed line for performing a removal process for removing the volatile organic compounds absorbed to the module and a cooling process for cooling the module that has undergone the removal process is provided on the other side of the moving-bed chamber.

8 Claims, 10 Drawing Sheets

CONTINUOUS CONCENTRATION SYSTEM AND METHOD FOR VOLATILE ORGANIC COMPOUNDS USING MOVING-BED REACTOR

BACKGROUND OF THE INVENTION

1. Field of the Invention

The present invention relates to a continuous concentration system for volatile organic compounds using a moving-bed reactor that improves the removal efficiency of volatile organic compounds, remarkably reduces the size thereof, and increases concentration ratio, by continuously performing processes of absorbing and removing volatile organic compounds generated in the industrial field.

2. Description of the Related Art

In recent years, many contaminants are being generated due to concentration of population. Among contaminants generated in such industrial and urban environments, volatile organic compounds (VOC) contain a large amount of substances harmful to human bodies, such as carcinogens.

The volume of volatile organic compounds is reduced using a concentration device, and the volatile organic compounds are separately removed after concentration thereof to make them harmless. However, since the density of the removed volatile organic compounds is not sufficiently high due to their low concentration ratio, auxiliary fuel and a large-sized facility are necessary and the process of treating them is complex.

A rotary absorption rotor is being used as a concentration device for some volatile organic compounds. According to the conventional concentration device, an absorption agent is filled in a cylindrical rotor to perform absorption, removal, and cooling thereof. As one rotor is rotated, the volatile organic compounds absorbed in an absorption region at a normal temperature are moved to a removal region to be removed by air of a high temperature, are cooled by air of a normal temperature in a cooling region by continuous rotation thereof, and then return to the absorption region. The absorption and removal of volatile organic compounds are repeated during continuous rotation of the rotor.

However, the absorption agent needs to have a sufficient thickness in order to completely absorb volatile organic compounds when the air containing the volatile organic compounds passes through the absorption layer of the rotor. In this case, since absorption, removal, and cooling of the volatile organic compounds are performed in one rotor and the removal and cooling regions have the same thickness, the absorption region is not thick enough in consideration of the removal and cooling of the volatile organic compounds. Therefore, since the volatile organic compounds pass through one rotor with the absorption region not being thick, absorption efficiency decreases. On the other hand, since almost all volatile organic compounds need to be removed in the removal region, the rotational speed of the rotor needs to be slow in order to secure sufficient removal time, increasing the period of the entire cycles. For this reason, the size of the absorption rotor and installation and management cost for the device increase.

SUMMARY OF THE INVENTION

The present invention has been made in view of the above problems, and the present invention provides a continuous concentration system in which volatile organic compounds are concentrated by performing continuous absorption and removal processes and the size thereof is reduced by making it compact, achieving high density concentration.

The present invention also provides a continuous concentration system in which an absorption agent for absorbing a volatile organic agent is embedded inside a frame of a module and the module undergoes a cycle of an absorption process, a removal process, and a cooling process while moving in a moving-bed chamber including an absorption bed line and a removal-cooling bed line whereby absorption efficiency is excellent and absorption-removal time is reduced.

The present invention also provides a continuous concentration system in which since an absorption bed line includes five or more modules, the length thereof is more than three times that of a substance transfer section, completely absorbing the volatile organic compounds, and volatile organic compounds are absorbed by a plurality of modules in an absorption bed line and are removed and cooled by one module respectively in the removal-cooling bed line, and in particular, since concentration ratio can be increased by reducing the amount of wind when high temperature air for removal passes through the module and the high temperature air passes through only one module, loss of pressure decreases.

The present invention also provides a continuous concentration system in which an inert gas such as nitrogen is used as a removal gas to remove the volatile organic compounds at a high density and recover the organic solvent, and when nitrogen is used as a carrier gas, volatile organic compounds can be safely concentrated at a high density and the volatile organic compounds mixed with nitrogen are condensed at the condenser to be recovered as solvent and the nitrogen is re-circulated for removal of volatile organic compounds.

In accordance with an aspect of the present invention, there is provided a continuous concentration system for volatile organic compounds for concentrating volatile organic compounds that undergo an absorption process and a removal process, the continuous concentration system comprising: a moving-bed chamber in which modules for absorbing volatile organic compounds are absorbed, wherein an absorption bed line to which the volatile organic compounds are supplied to be absorbed to the module is provided on one side of the moving-bed chamber, and a removal-cooling bed line for performing a removal process for removing the volatile organic compounds absorbed to the module and a cooling process for cooling the module that has undergone the removal process is provided on the other side of the moving-bed chamber.

In accordance with another aspect of the present invention, there is provided a moving-bed chamber for a continuous concentration system for volatile organic compounds for concentrating volatile organic compounds that undergo an absorption process and a removal process, wherein a module for absorbing the volatile organic compounds is embedded in the moving-bed chamber, an absorption bed line to which the volatile organic compounds are supplied to be absorbed to the module is provided on one side of the moving-bed chamber, and a removal-cooling bed line for performing a removal process for removing the volatile organic compounds absorbed to the module and a cooling process for cooling the module that has undergone the removal process is provided on the other side of the moving-bed chamber.

In accordance with another aspect of the present invention, there is provided a module for a continuous concentration system for volatile organic compounds for concentrating volatile organic compounds that undergo an absorption process and a removal process, wherein the module is embedded in the moving-bed chamber to absorb the volatile organic compounds, an absorption bed line to which the volatile organic compounds are supplied to be absorbed to the module is provided on one side of the moving-bed chamber, a removal-cooling bed line for performing a removal process for removing the volatile organic compounds absorbed to the module and a cooling process for cooling the module that has undergone the removal process is provided on the other side of the moving-bed chamber, an absorption agent for absorbing the volatile organic compounds is embedded in the module, a frame surrounding the absorption agent embedded in the module forms the outer body of the module, and the frame is opened toward a side where the volatile organic compounds are supplied and discharged and is closed on a side of the absorption bed line.

In accordance with another aspect of the present invention, there is provided a continuous concentration method for volatile organic compounds for concentrating volatile organic compounds that undergo an absorption process and a removal process, the continuous concentration method comprising: locating a module absorbing volatile organic compounds in a chamber including an absorption bed line to which the volatile organic compounds are absorbed and a removal-cooling bed line from which the absorbed volatile organic compounds are removed; absorbing the volatile organic compounds by the module in the absorption bed line, by supplying the volatile organic compounds to the absorption bed line by an operation of a blower fan; moving the module to which the volatile organic compounds are absorbed to a first module chamber in the absorption bed line; removing the volatile organic compounds absorbed to the module by carrier gas after the module is moved from the second module chamber to a removal chamber; cooling the module using cooling gas after the module from which the volatile organic compounds are removed is moved from the removal chamber to a cooling chamber; moving the cooled module to a second module chamber; and moving the module in the second module chamber to the absorption bed line, wherein the volatile organic compounds are absorbed and removed by the module while the module is circulating and passing through the absorption bed line, the removal-cooling bed line, and the first and second module chambers.

According to the present invention, the continuous concentration system for volatile organic compounds includes an absorption bed line and a removal-cooling bed line. Modules are embedded in the bed lines. If the module located at an inlet of the absorption bed line is saturated, it is moved from the absorption bed to the removal bed, the module in the removal bed is moved to a cooling mode, and the module in the cooling mode is sequentially moved to an exit spot of the absorption bed line again. The volatile organic compounds are continuously supplied to the absorption bed line even when the module is moved and are processed whereby the cycle for absorbing the volatile organic compounds while the module is moving is so short that the size of the system is remarkably reduced. Removal air whose amount is small as compared with the amount of introduced volatile organic compounds is used to achieve high concentration. The highly concentrated organic compounds are recovered as organic solvent by condensation or are used as an energy source for heating the removal air.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Hereinafter, an exemplary embodiment of the present invention will be described in detail with reference to the accompanying drawings.

Figure 1:
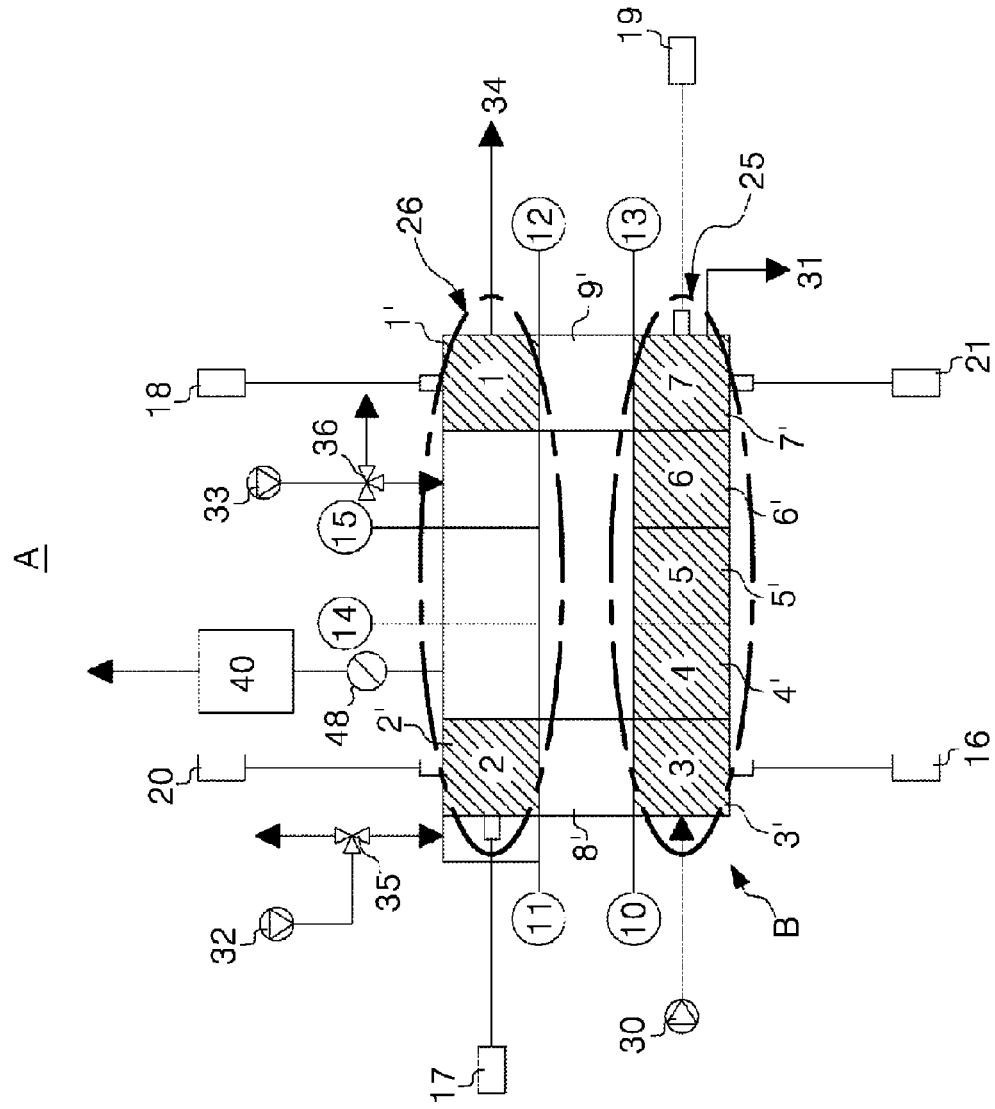
FIG. 1 is a schematic view of a continuous concentration system according to an embodiment of the present invention.
Figure 2:
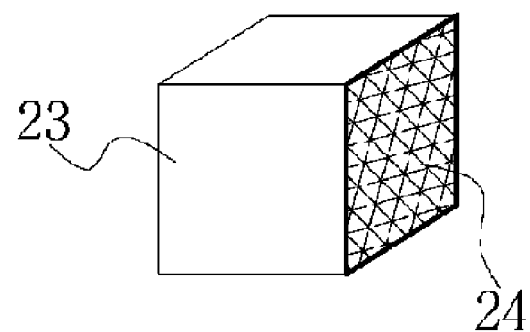
FIG. 2 is a perspective view of a module applied to the continuous concentration system according to the embodiment of the present invention.
Figure 6:
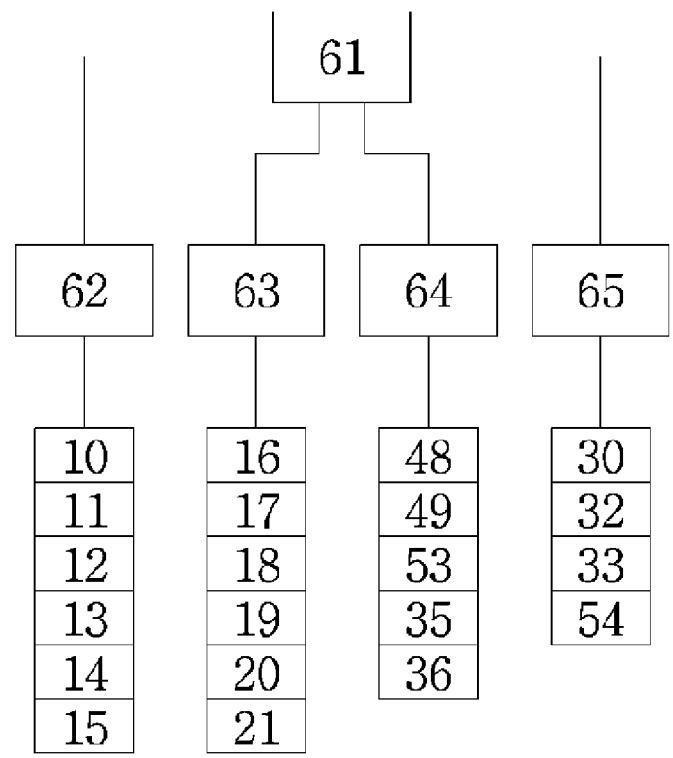
FIG. 6 is a schematic view for explaining control of the continuous concentration system according to the embodiment of the present invention.
Figure 7:
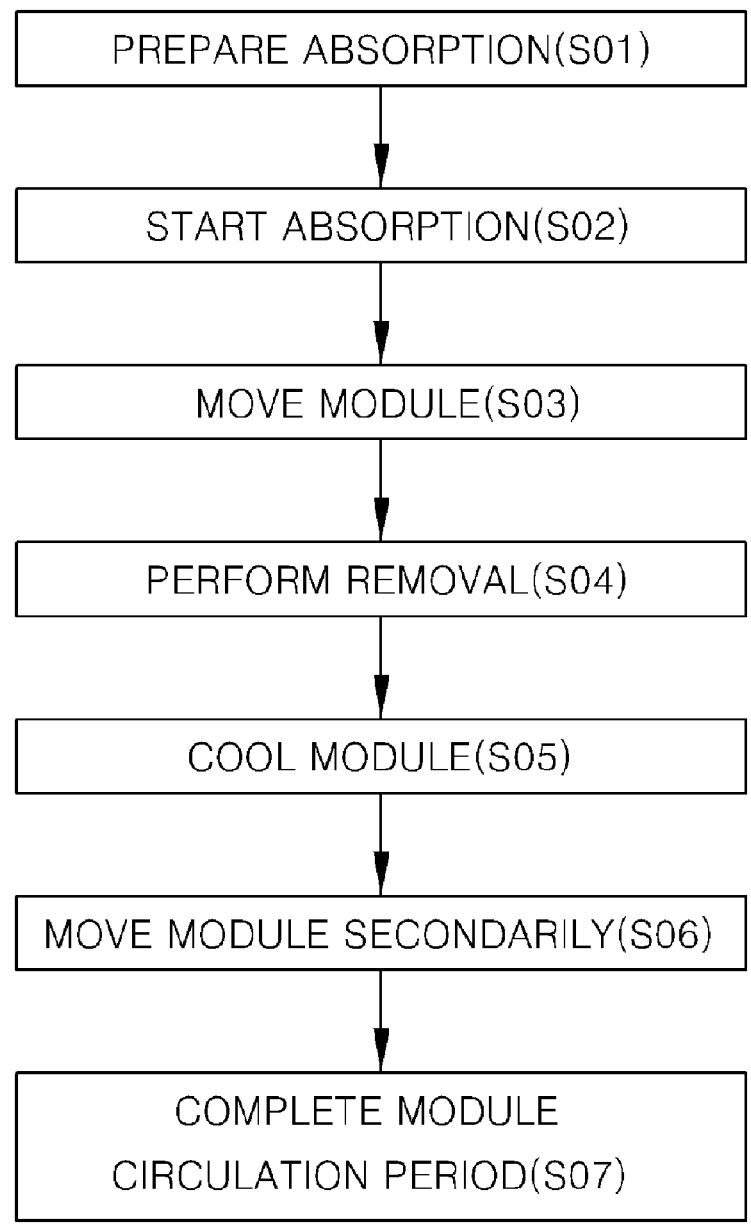
FIG. 7 is a flowchart illustrating a continuous concentration method using a unit module of the continuous concentration system according to the embodiment of the present invention.

FIG. 1 is a schematic view of a continuous concentration system according to an embodiment of the present invention. FIG. 2 is a perspective view of a module applied to the continuous concentration system according to the embodiment of the present invention. FIGS. 3A to 3D are views illustrating movement states of a module in a moving-bed chamber of the continuous concentration system according to the embodiment of the present invention. FIG. 4 is a schematic view for explaining a process of recovering volatile organic compounds with an organic solvent in the continuous concentration system according to the embodiment of the present invention. FIG. 6 is a schematic view for explaining control of the continuous concentration system according to the embodiment of the present invention. FIG. 7 is a flowchart illustrating a continuous concentration method using a unit module of the continuous concentration system according to the embodiment of the present invention.

The continuous concentration system A for volatile organic compounds using a moving-bed reactor according to the embodiment of the present invention concentrates volatile organic compounds after absorbing and removing them. The continuous concentration system A includes a moving-bed chamber B in which modules for absorption of volatile organic compounds are installed. An absorption bed line 25 through which volatile organic compounds are supplied to be absorbed to the modules is provided on one side of the moving-bed chamber B. A removal-cooling bed line 26 for a removal process for removing the volatile organic compounds absorbed to the modules and a cooling process for cooling the modules to which the removal process has been finished is provided on the other side of the moving bed chamber B.

Accordingly, the absorption bed line 25 of the moving-bed chamber B has an absorption chamber in which an absorption process for absorbing volatile organic compounds to the modules, and the removal-cooling bed line 26 has a removal chamber 2' for a removal process and a cooling chamber 1' for a cooling process. A module chamber 8' is provided between the absorption chamber and the removal chamber 2', and a module chamber 9' is provided between the cooling chamber 1' and the absorption chamber. Accordingly, there may be provided a plurality of absorption chambers. In the embodiment of the present invention, a plurality of absorption chambers enable absorption of volatile organic compounds by the modules therein and movement of the modules by an actuator 19. Therefore, since the modules can be continuously moved at the same time when the volatile organic compounds are absorbed by the modules, the other processes can be continuously operated in cycles due to additional processes.

The absorption bed line 25, i.e. an absorption region is formed on one side of the moving-bed chamber B of the continuous concentration system A and the removal-cooling bed line 26 is formed on the other side thereof. Both the bed lines have circular or elliptical shapes so that the entire moving-bed chamber B may have a circular or elliptical planar shape. Further, the moving-bed chamber B may have a rectangular shape as illustrated in the drawing. It is apparent that the moving-bed chamber B may have various shapes. When the moving-bed chamber B preferably has a rectangular planar shape, flow of the gas containing volatile organic compounds can be smoother and the removal and cooling processes can be easily performed.

The main characteristics of the present invention are that the absorption, removal, and cooling processes are performed with the modules moving through the chambers partitioned in the rectangular moving bed chamber B according to their operations, increasing the efficiency of the moving bed chamber B.

In the embodiment of the present invention, a total of five absorption chambers are illustrated, but the present invention is not limited thereto. It is apparent that the number of absorption chambers may be selectively applied according to the installation condition of the continuous concentration system A.

A gate 10 is provided between the absorption bed line 25 of the moving-bed chamber B and the module chamber 8', and a gate 11 is provided between the module chamber 8' and the removal chamber 2'. Gates 14 and 15 are provided between the module chamber 2' and the cooling chamber 1', a gate 12 is provided between the cooling chamber 1' and the module chamber 9', and a gate 13 is provided between the module chamber 9' and the absorption bed line 25.

The structure prevents volatile organic compounds, a carrier gas, and cooling air from being discharged to the chamber of other regions during movement of the modules saturated between the chambers.

The actuator is provided as a means for moving the modules between the chambers, and can be a stepping motor, or a hydraulic or pneumatic cylinder.

More particularly, as illustrated in FIG. 1, the continuous concentration system A includes an actuator 16 for moving the module located on the absorption bed line 25 of the moving-bed chamber B to the module chamber 8', an actuator 20 for moving the module located in the module chamber 8' to the removal chamber 2', an actuator 17 for moving the module located in the removal chamber 2' to the cooling chamber 1', an actuator 18 for moving the module located in the cooling chamber 1' to the module chamber 9', an actuator 21 for moving the module located in the module chamber 9' to the absorption bed line 25, and an actuator 19 for moving the module located in the absorption bed line 25.

The actuators 16, 17, 18, and 19 push the corresponding modules, and the remaining actuators 20 and 21 pull the modules in the chambers 8' and 9'. To achieve this, the actuators may be variously operated in the form of hooks or using absorption plates or magnetic fields.

The module 22 of the continuous concentration system A according to the embodiment of the present invention easily absorbs the volatile organic compounds supplied to the absorption bed line 25, and removes the volatile organic compounds absorbed by the heated carrier gas. The module 22 is optimized so as to be applied to the moving-bed chamber B, and as illustrated in FIG. 2, an absorption agent 24 for absorbing volatile organic compounds is embedded in the module, and a frame 23 surrounding the absorption agent 24 embedded in the module preferably forms the outer body of the module. In particular, the frame 23 is opened toward the side on which the volatile organic compounds are supplied and discharged and is closed toward the absorption bed line 25 from the moving-bed chamber B. When the module 22 is moved from the absorption chamber 3' to the module chamber 8' and the removal chamber 2', since the side of the absorption bed line 25 is closed in the moving-bed chamber B, the volatile organic compounds supplied to the absorption bed line 25 are prevented from being discharged. The module 22 has a shape corresponding to the internal shapes of the chambers of the moving-bed chamber B, and the frame 23 of the module 22 has a rectangular box-like shape.

As illustrated in FIGS. 1 and 4, in the continuous concentration system A for volatile organic compounds using a moving-bed reactor, the volatile organic compounds are supplied by a blower fan 30, and then the volatile organic compounds are removed by the carrier gas of the removal-cooling bed line 26 and are sent to a condenser 41 to be recovered by an organic solution.

Figure 5:
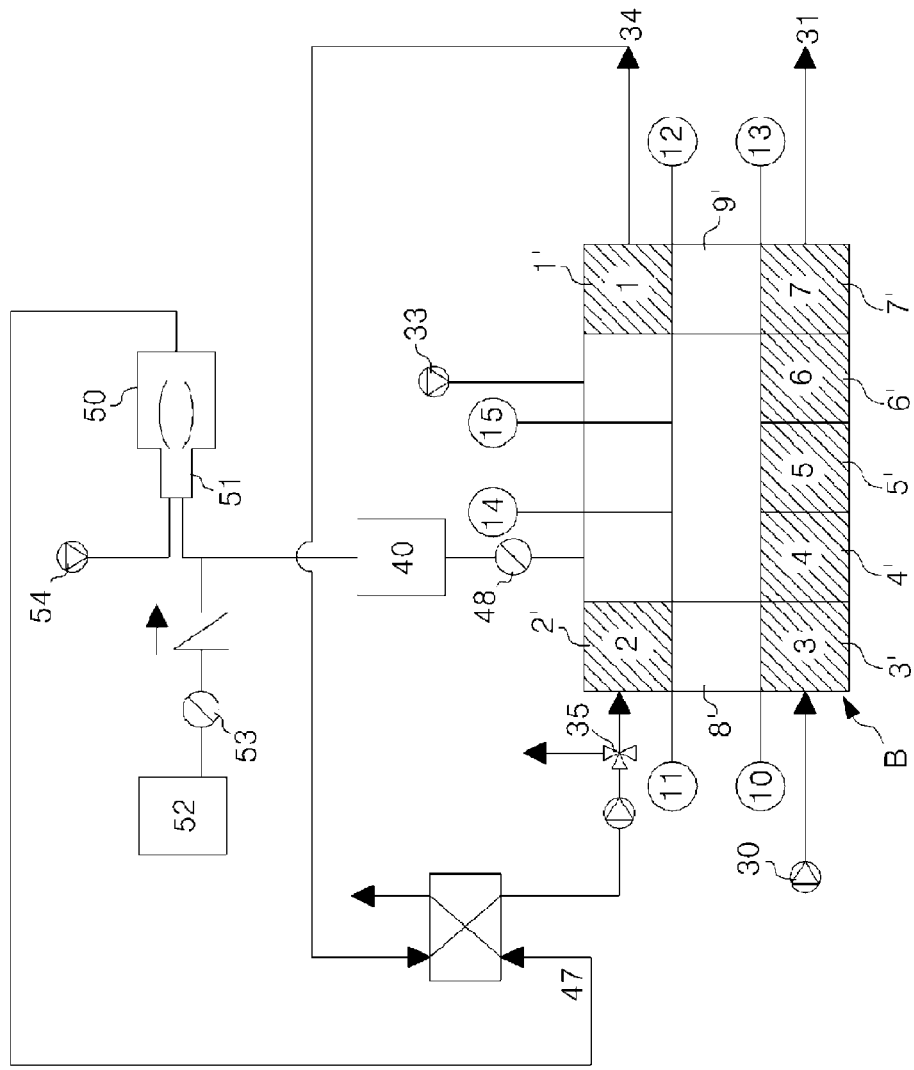
FIG. 5 is a schematic view illustrating a combustion process for volatile organic compounds in the continuous concentration system according to the embodiment of the present invention.

As illustrated in FIGS. 1 and 5, the removed volatile organic compounds are burned and the carrier gas is heated by the burned exhaust gas of high temperature.

As illustrated in FIGS. 1 and 6, the control unit of the continuous concentration system for volatile organic compounds using a moving-bed reactor according to the embodiment of the present invention includes a gate signal processing module 62 processing control signals for operating the gates 10, 11, 12, 13, 14, and 15; an actuator signal processing module 63 processing control signals for operating the actuators 16, 17, 18, 19, 20, and 21; a valve signal processing module 64 processing control signals for operating the valves 48, 49, and 53 and the 3-way valves 35 and 36; a fan signal processing module 65 processing control signals for operating the blower fans 30, 32, 33, and 54; and a main controller 61 for controlling the operations of the gate signal processing module 62, the actuator signal processing module 63, the valve signal processing module 64, and the fan signal processing module 65.

The continuous concentration method of the continuous concentration system A according to the embodiment of the present invention is controlled by the main controller 61. In other words, as illustrated in FIGS. 1, 6, and 7, the process of the continuous concentration method for absorbing, removing, and concentrating volatile organic compounds will be described with reference to the path of a unit module. First, a module for absorbing volatile organic compounds is located in the chamber including the absorption bed line 25 for absorbing the volatile organic compounds and the removal-cooling bed line 26 for removing the absorbed volatile organic compounds (S01). The sensor values of the members are input with the members of the continuous concentration system A according to the embodiment of the present invention being installed, in order to determine preparation of normal operations of the members.

With the operation having been prepared, volatile organic compounds are supplied to the absorption bed line 25 by the operation of the blower fan 30 to absorb the volatile organic compounds by the module in the absorption bed line 25 (S02). Then, as illustrated in 3A, the moving-bed chamber performs the absorption operation with a plurality of modules 3, 4, 5, 6, and 7 being embedded in the absorption chambers 3', 4', 5', 6', and 7' respectively.

Thereafter, the module to which the volatile organic compounds are absorbed is moved to the module chamber 8' in the absorption bed line 25 (S03).

After the module is moved from the module chamber 8' to the removal chamber 2', the volatile organic compounds absorbed to the module are removed by carrier gas (S04) to remove the volatile organic compounds from the saturated module. The removed volatile organic compounds are fed to a condenser or a burner.

The module from which the volatile organic compounds are removed in step S04 is moved from the removal chamber 2' to the cooling chamber 1' to be cooled by cooling gas (S05).

Thereafter, the cooled module is moved to the module chamber 9' (S06), and the module of the module chamber 9' is moved to the absorption bed line 25 (S07), whereby the absorption bed line 25 absorbs the volatile organic compounds.

Accordingly, in the continuous concentration system A for volatile organic compounds using a moving-bed reactor according to the embodiment of the present invention, the volatile organic compounds are absorbed and removed by the module when the module circulates the absorption bed line 25, the removal-cooling bed line 26, and the module chambers 8' and 9'.

Hereinafter, the continuous concentration system A for volatile organic compounds using a moving-bed reactor according to the embodiment of the present invention will be described in detail.

According to the embodiment of the present invention, the volatile organic compounds are continuously removed by absorption and removal methods so that the size of the system is reduced and high concentration is possible whereby volatile organic compounds discharged in the industrial field may be used as materials for various purposes.

In other words, in the continuous concentration system A for volatile organic compounds using a moving-bed reactor, volatile organic compounds are absorbed by absorption members, are removed by heating them, and then are cooled again, so that the recycling cycles of the absorption members are continuously carried out.

In the continuous concentration system A, the amount of gas containing the volatile organic compounds introduced is smaller than the amount of gas containing the volatile organic compounds discharged during removal of the volatile organic compounds. The gas containing the discharged volatile organic compounds of high density may be variously used as a hot wind energy source for removal of the volatile organic compounds, a fuel for recovering organic solvent, a fuel for production of hydrogen in a reformer for driving fuel cells, or a fuel for driving gas engines.

As illustrated in FIGS. 1 to 6, the continuous concentration system A for volatile organic compounds using a moving-bed reactor according to the embodiment of the present invention includes an absorption bed line 25 and a removal-cooling bed line 26. A plurality of modules 22 are located in the bed lines, and an absorption agent 24 is provided inside the frame 23 of the module 22 whereby the module can be moved.

Various absorption devices may be used, such as activated carbon fiber, activated carbon fiber coated with a dielectric heating material, and ceramic fiber paper in which zeolite is supported.

FIG. 1 illustrates a simple structure of a movement unit for moving the modules 22 in the bed lines 25 and 26. The movement unit may include an actuator such as an air cylinder, a hydraulic cylinder, or a servo motor. Driving of an actuator that is a movement unit is controlled by a programmable controller (PLC).

Accordingly, the gas containing the volatile organic compounds at the beginning is continuously supplied to the absorption bed line 25 by a blower 30, and is discharged through an absorption line exit 31 via the modules 22 (the modules 3 to 7 in FIG. 1) located in the absorption chambers 3' to 7'. When the gas containing the volatile organic compounds passes through the modules 3 to 7, the volatile organic compounds are absorbed to the modules 22.

In the module 22 to which the volatile organic compounds are absorbed, if the high temperature gas for removal passes through the module 2 located in the removal chamber 2' of the removal-cooling bed line 26 by a removal blower 32, the volatile organic compounds are discharged via a buffer tank 40 together with the high temperature gas for removal, and the gas containing the discharged volatile organic compounds may be used for various purposes via a post-processing process. The removed volatile organic compounds are discharged together with the gas of high density, and an inert gas may be used as the carrier gas to avoid possibility of a fire. The module 22 that has undergone the removal process is moved to the cooling chamber 1' operated in a cooling mode, and the module 1 located in the cooling chamber 1' is cooled by a cooling blower 33.

The operation of the continuous concentration system A according to the embodiment of the present invention is as follows. In other words, as illustrated in FIGS. 3A to 3D, the modules repeat a continuous concentration cycle including an absorption process, a removal process, and a cooling process.

Accordingly, the absorption agent of the module 3 located in the absorption chamber 3' that is at an inlet side of the absorption bed line 25 reaches a saturation state first. If the absorption agent of the module 3 reaches the saturation state, the module starts to move when the absorption efficiency of the absorption agent is lost.

The saturated module 3 in the absorption chamber 3' is moved to the removal chamber 2' where removal of the removal-cooling bed line 26 is performed, and the module 2 in the removal chamber 2' where the removal of the removal-cooling bed line 26 is performed is moved to the cooling chamber 1'. The module 1 in the cooling chamber 1' where cooling is performed is moved to the absorption chamber 7' that is at an exit of the absorption bed line 25.

Accordingly, since the module 1 in the cooling chamber 1' is located in the absorption chamber 7' on the side where the clear gas from which the volatile organic compounds are removed is discharged, much absorption is generated in the module 22 in the absorption chamber 3' that is the final location of the absorption bed line 25. Accordingly, the modules 22 are moved to the removal-cooling bed line 26 in the order of the amount of absorption of the volatile organic compounds.

The absorption chambers 3', 4', 5', 6', and 7' that are at the empty spaces formed after the saturated module 22 in the absorption chamber 3' is moved are occupied by the next module 22, whereby the module 22 recycled by removing the volatile organic compounds is moved to the absorption chamber 7' that is the last exit spot of the absorption bed line 25.

In particular, one module is an object in the removal and cooling processes. Accordingly, the single module 22 reduces the length of the absorption agent, decreasing loss of pressure, and sends a small amount of removed high temperature air in the removal process, increasing concentration ratio. As the module in the chamber 3' that is at an inlet through which the volatile organic compounds are introduced is moved in the absorption bed line 25, the entire modules are sequentially moved, but since the modules are promptly moved, the ratio occupied by the movement time of the module 22 is very low, increasing absorption efficiency.

In the embodiment of the present invention, the absorption bed line 25 includes five chambers that simultaneously perform absorption processes, but the present invention is not limited thereto. In other words, a plurality of modules whose number is selectively applied can be provided according to environments such as the installation situation of the continuous concentration system, the capacity of treated volatile organic compounds, and use of removed compounds. Furthermore, a single chamber and a single module are provided in the removal and cooling processes, but the present invention is not limited thereto. In other words, a plurality of chambers or modules are possible.

Hereinafter, a process of recovering organic solvent by condensing volatile organic compounds in the continuous concentration system A according to the embodiment of the present invention will be described in detail with reference to FIG. 4. As mentioned above, the high concentration causes the possibility of a fire and an inert gas is preferably used as the carrier gas. Accordingly, the carrier gas heated by a heat exchanger 46 to which heat is supplied through a heat supply pipe 47, i.e. nitrogen is supplied to the module 2 in the removal chamber 2' through the removal blower 32. As a result, the gas containing the removed and concentrated volatile organic compounds is sent to the condenser 41 via a buffer tank 40. Thereafter, cooling water is supplied from a cooling tower 42 to the condenser 41, and the gas containing the cooled and condensed volatile organic compounds is recovered by an organic solvent recovering tank 43 and the non-condensing gas, i.e. nitrogen is sent to the heat exchanger 46 to be heated and re-circulated. Then, if some loss occurs during the operation, it is supplemented by a nitrogen tank 45. The module that has been moved according to an input schedule to the removal mode is moved to the chamber 1' in the cooling mode. The direction of the three-way valve 35 on the line of removed hot air before the movement of the module is converted to the buffer tank 40, and then the valve 49 is opened and the valve 48 is closed, converting a cooled air 3-way vale 36 to an external exhaust state.

The gates 14 and 15 are opened and the module 2 is moved to the position of the chamber 1', and then the gates 14 and 15 are closed. After the movement of the module 2, the 3-way valves 35 and 36 are converted to an original normal position, and the valve 48 is opened and the valve 49 is closed. The flow of the gas containing the condensed volatile organic compounds is instantaneously stopped during the movement of the module, but does not cause any trouble to the operation of the condenser 41. The gas containing the volatile organic compounds is normally supplied by the blower 30 even when the module is moved, and is discharged through the absorption line exit 31, whereby the system is normally operated.

The heat generated when the gas containing the condensed and discharged volatile organic compounds is heat-exchanged with external air to be used as removal air by generating hot wind as in the system of FIG. 5. In other words, the gas containing the volatile organic compounds concentrated and removed by the hot wind is burned in a combustion chamber 50 by a burner 51 via the buffer tank, and the generated hot exhaust gas transfers heat to the heat exchanger 46 and is discharged to the outside. Since the removed gas has a high density of volatile organic compounds, it can be burned by itself. Further, since there is a change in the amount of supplied volatile organic compounds removed during the movement of the module, the buffer tank 40 reduces the change.

The cooling air may pass through the module 1 of the cooling chamber 1' and the cooling outlet 34 and enter the heat exchanger 46 so that heat can be transferred from the exhaust gas to the cooling air, whereby it may be used as the removal air. Since the gates 14 and 15 need to be opened when the module 2 in the removal mode is moved to the cooling chamber 1' in the cooling mode, the 3-way valve on the hot removal air line is converted to the external exhaust and the valve 48 is closed. Then, since supply of the gas to the combustion chamber 50 is temporarily stopped, the gas in an LPG tank 52 is supplied into the combustion chamber 50 and an air fan 54 for combustion is operated by the operation of an LPG valve 53 when the valve 48 is closed. Then, the valve 48 is opened as the movement of the module 22 is completed and the valve 48 is opened, gradually stopping supply of LPG. The gas containing volatile organic compounds is normally supplied through the blower 30 during movement of the module and is discharged to the absorption line exit 31 to normally operate the system.

Hereinafter, the operation of the continuous concentration system A using a moving-bed reactor will be described in detail. The module starts to move when the absorption agent of the module located at an inlet through which volatile organic compounds enters in the absorption bed line 25, and the order is as illustrated in FIGS. 3A to 3D. The continuous concentration system A for volatile organic compounds using a moving-bed reactor includes an absorption bed line 25 including absorption chambers 3', 4', 5', 6', and 7' in which the modules 3, 4, 5, 6, and 7 are located; and a removal-cooling bed line 26 including a removal chamber 2' and a cooling chamber 1' in which the modules 2 and 1 are located.

Figure 3A:
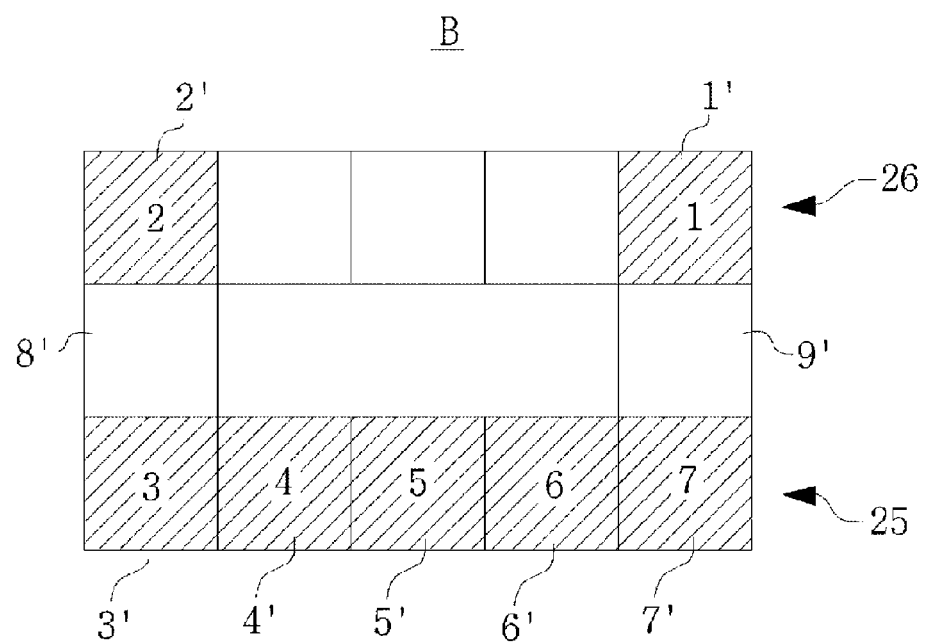
FIGS. 3A to 3D are views illustrating movement states of a module in a moving bed chamber of the continuous concentration system according to the embodiment of the present invention.
Figure 3B:
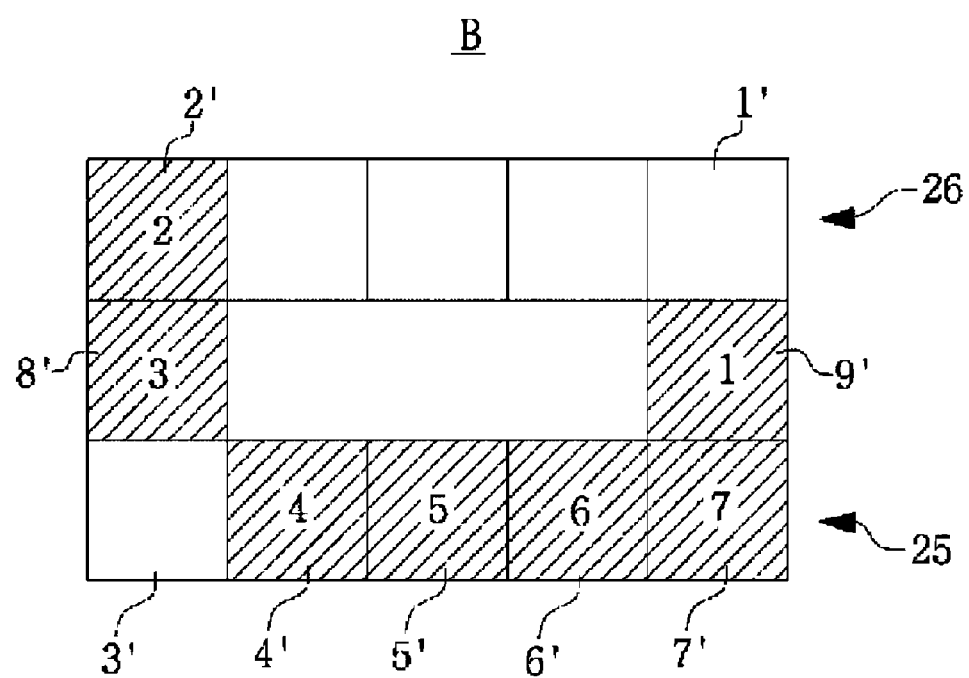
Figure 4:
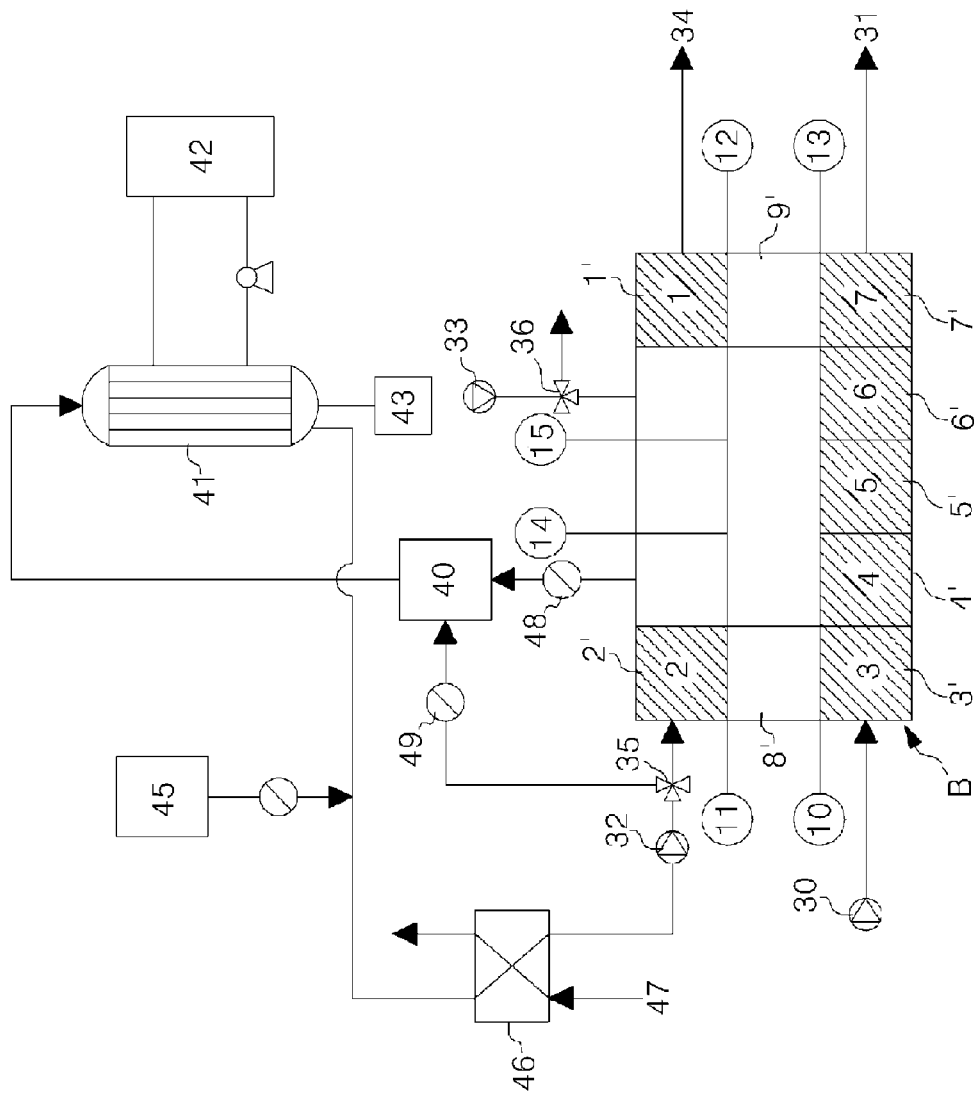
FIG. 4 is a schematic view for explaining a process of recovering volatile organic compounds with an organic solvent in the continuous concentration system according to the embodiment of the present invention.

The positions of the modules when the modules 22 are stopped are as illustrated in FIG. 3A. In other words, five chambers 3', 4', 5', 6', and 7' are occupied by the modules 3, 4, 5, 6, and 7 in the absorption bed line 25. If the module 3 located in the chamber 3' on the side of an inlet of the absorption bed line 25 is saturated by the absorption process, gates 10 and 12 are opened for a removal process. The module 3 located in the absorption chamber 3' is moved into the module chamber 8', and after the module 1 is moved to the module chamber 9', the gates 10 and 12 are closed again as illustrated in FIG. 3B.

Then, since the gate 11 is closed, the volatile organic compounds cannot enter the removal-cooling bed line 26. Furthermore, since the shape of the module 22 is blocked by a frame sideward as illustrated in FIG. 2 and an absorption agent is located at the center thereof, gas can flow only toward the exit 31 of the absorption line on the side where the blower 30 is located, whereby gas is prevented from flowing from the absorption bed line 25 to the removal-cooling bed line 26 by the frame 23 of the module 22 in the absorption bed line 25. Accordingly, since the gas containing the volatile organic compounds that are to be treated continuously enters the absorption chamber 3' even during the movement of the module and is discharged through the absorption chamber 7', the volatile organic compounds are continuously absorbed by the modules 4, 5, 6, and 7 even with the module 3 being removed from the absorption chamber 3'.

Figure 3C:
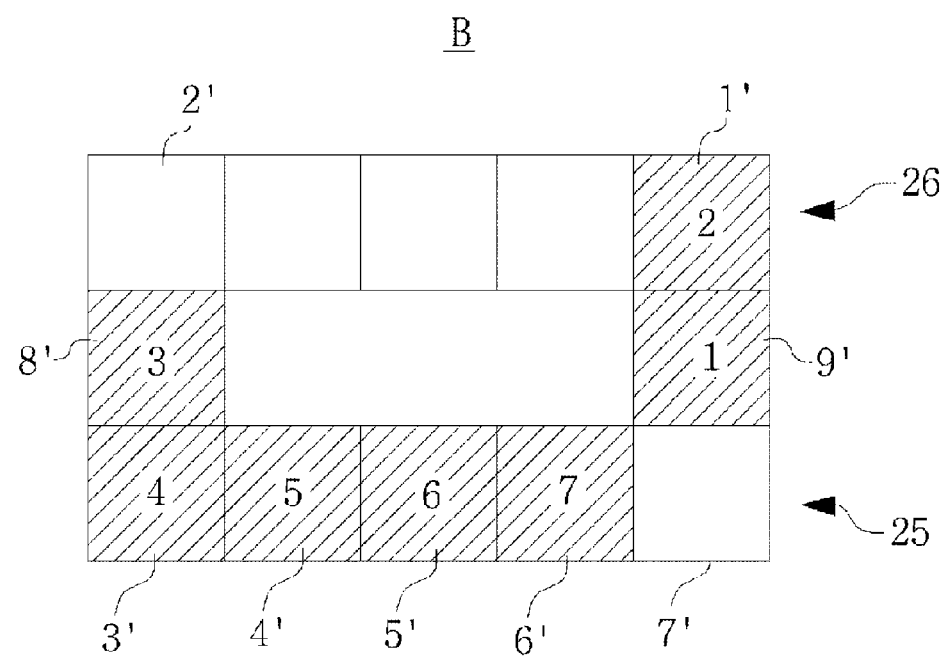

Thereafter, the gates 14 and 15 are opened, and the module 2 in the removal mode is moved toward the cooling chamber 1' in the cooling mode. The module 4 in the absorption chamber 4' is moved to the absorption chamber 3', the module 5 in the absorption chamber 5', to the absorption chamber 4', the module 6 in the absorption chamber 6', to the absorption chamber 5', and the module in the absorption chamber 7', to the absorption chamber 6'. If the movement of the modules is completed, the gates 14 and 15 are closed as illustrated in FIG. 3C. In the process, the hot removal air and the cooling air may meet each other in an empty space of the removal-cooling bed line 26, and therefore the removal air is converted from the 3-way valve 35 during the movement of the module 2 to prevent it.

Figure 3D:
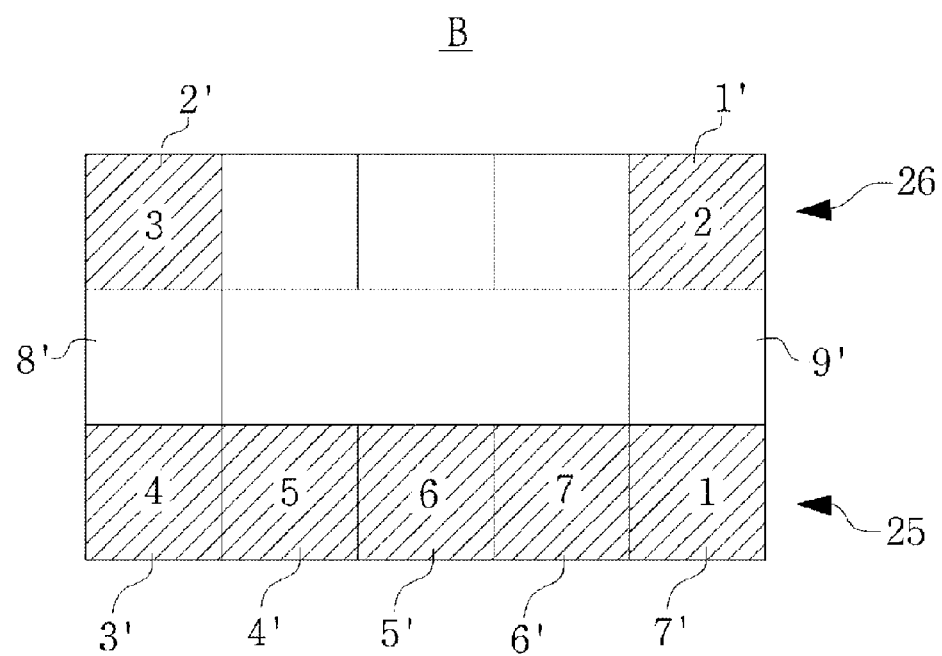

Thereafter, after the gates 11 and 13 are opened, the module 3 in the module chamber 8' is moved to the removal chamber 2', and the module 1 in the module chamber 9' is moved to the absorption chamber 7', the gates 11 and 13 are closed as illustrated in FIG. 3D. In the process, since the gates 10 and 12 are closed, the volatile organic compounds supplied to the absorption module line 25 cannot enter the removal-cooling bed line 26.

Hereinafter, the detailed operation of the continuous concentration system A for volatile organic compounds using a moving-bed reactor will be described. The modules located in the chambers can be moved by actuators. The actuators include servo motors and hydraulic or pneumatic cylinders. In the case of cylinders, the gates 10 and 12 are opened to start movement of the module 3 in the absorption chamber 3' and the module 1 in the cooling chamber 1'. Thereafter, the module 3 is moved into the module chamber 8' by a cylinder, and the module 1 is moved into the module chamber 9' by a cylinder (actuator 18). Thereafter, the gates 10 and 12 are closed as illustrated in FIG. 3B.

Then, the gates 14 and 15 are opened, the module 2 is moved to the cooling chamber 1' by the cylinder 17, and the modules 4, 5, 6, and 7 are moved to the absorption chambers 3', 4', 5', and 6' by the cylinder (actuator 19). If the movement of the modules is completed, the gates 14 and 15 are closed as illustrated in FIG. 3C.

Thereafter, the gates 11 and 13 are opened, the module 3 in the module chamber 8' is moved to the removal chamber 2' by the cylinder 20, and the module 1 in the module chamber 9' is moved to the absorption chamber 7' by the cylinder 21. Then, the gates 11 and 13 are closed as illustrated in FIG. 3D.

Since the gates 10, 11, 12, and 13 are sequentially opened and closed even during the movement of the modules, the gas containing the volatile organic compounds supplied to the absorption bed line 25 is prevented from being discharged to the removal-cooling bed line 26.

According to the present invention, the volatile organic compounds are concentrated by performing the continuous absorption and removal processes and the size of the system is reduced by making the system compact, achieving high density concentration.

Further, the absorption agent for absorbing the volatile organic agent is embedded inside the frame of the module and the module undergoes a cycle of an absorption process, a removal process, and a cooling process while moving in the moving-bed chamber including the absorption bed line and the removal-cooling bed line, whereby absorption efficiency is excellent and the absorption-removal time is reduced.

Furthermore, since the absorption bed line includes five or more modules, the length thereof is more than three times that of the substance transfer section, thus completely absorbing the volatile organic compounds. The volatile organic compounds are absorbed by a plurality of modules in the absorption bed line, and are removed and cooled by one module respectively in the removal-cooling bed line. In particular, since concentration ratio can be increased by reducing the amount of wind when high temperature air for removal passes through the module, and the high temperature air passes through only one module, loss of pressure decreases.

Furthermore, an inert gas such as nitrogen is used as the removal gas to remove the volatile organic compounds at a high density and recover the organic solvent. When nitrogen is used as the carrier gas, the volatile organic compounds can be safely concentrated at a high density and the volatile organic compounds mixed with nitrogen are condensed at the condenser to be recovered as solvent and the nitrogen is re-circulated for removal of volatile organic compounds.

Although an exemplary embodiment of the present invention has been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A continuous concentration system for volatile organic compounds for concentrating volatile organic compounds that undergo an absorption process and a removal process, the continuous concentration system comprising:
    a moving-bed chamber in which modules for absorbing volatile organic compounds are contained,
    wherein an absorption bed line to which the volatile organic compounds are supplied to be absorbed to the module is provided on one side of the moving-bed chamber, and
    a removal-cooling bed line for performing a removal process for removing the volatile organic compounds absorbed to the module and a cooling process for cooling the module that has undergone the removal process is provided on the other side of the moving-bed chamber,
    wherein the absorption and removal processes are continuously performed by the module moved while circulating the absorption bed line and the removal-cooling bed line, a blower supplies the volatile organic compounds to the absorption bed line, a removal blower supplies carrier gas to the removal-cooling bed line to remove the volatile organic compounds absorbed into the module, removal gas concentrated and removed by the carrier gas in the removal-cooling bed line is sent to a condenser, the volatile organic compounds are condensed to organic solvent by refrigerant circulated to a cooling tower and is recovered to an organic solvent recovering tank, and after the carrier gas in the condenser is re-circulated and supplied to a heat exchanger and is heated, it is circulated by the removal blower again.

2. A continuous concentration system of claim 1, wherein the absorption bed line has an absorption chamber for performing the absorption process by absorbing the volatile organic compounds to the module and the removal-cooling bed line has a removal chamber for performing the removal process and a cooling chamber 1' for performing the cooling process, a first module chamber is provided between the absorption chamber and the removal chamber, and a second module chamber is provided between the cooling chamber and the absorption chamber.

3. The continuous concentration system of claim 2, wherein a gate is installed between the absorption bed line and the first module chamber, a gate is provided between the first module chamber and the removal chamber, gates are provided between the removal chamber and the cooling chamber, a gate is provided between the cooling chamber and the second module chamber, and a gate is provided between the second module chamber and the absorption bed line.

4. The continuous concentration system of claim 2, wherein the moving-bed chamber includes: an actuator for moving the module located in the absorption bed line into the first module chamber, an actuator for moving the module located in the first module chamber into the removal chamber, an actuator for moving the module located in the removal chamber into the cooling chamber, an actuator for moving the module located in the cooling chamber into the second module chamber, an actuator for moving the module located in the second module chamber to the absorption bed line, and an actuator for moving the module located in the absorption bed line.

5. The continuous concentration system of claim 1, wherein an absorption agent for absorbing the volatile organic compounds is embedded in the module, a frame surrounding the absorption agent embedded in the module forms the outer body of the module, and the frame is opened toward a side where the volatile organic compounds are supplied and discharged and is closed on a side of the absorption bed line.

6. A continuous concentration method for volatile organic compounds for concentrating volatile organic compounds that undergo an absorption process and a removal process, the continuous concentration method comprising:
   locating a module absorbing volatile organic compounds in a chamber including an absorption bed line to which the volatile organic compounds are absorbed and a removal-cooling bed line from which the absorbed volatile organic compounds are removed;
   absorbing the volatile organic compounds by the module in the absorption bed line, by supplying the volatile organic compounds to the absorption bed line by an operation of a blower fan;
   moving the module to which the volatile organic compounds are absorbed to a first module chamber in the absorption bed line;
   removing the volatile organic compounds absorbed to the module by carrier gas after the module is moved from the first module chamber to a removal chamber;
   cooling the module using cooling gas after the module from which the volatile organic compounds are removed is moved from the removal chamber to a cooling chamber;
   moving the cooled module to a second module chamber; and
   moving the module in the second module chamber to the absorption bed line,
   wherein the volatile organic compounds are absorbed and removed by the module while the module is circulating and passing through the absorption bed line, the removal-cooling bed line, and the first and second module chambers,
   wherein a first gate and a second gate are opened and closed first so that the volatile organic compounds supplied to the absorption bed line cannot be introduced into the removal-cooling bed line, and then a third gate and a fourth gate are opened and closed when the module is moved to the first module chamber and the second module chamber, and the module is moved by actuators.

7. A continuous concentration system for volatile organic compounds for concentrating volatile organic compounds that undergo an absorption process and a removal process, the continuous concentration system comprising:
   a moving-bed chamber in which modules for absorbing volatile organic compounds are contained,
   wherein an absorption bed line to which the volatile organic compounds are supplied to be absorbed to the module is provided on one side of the moving-bed chamber, and
   a removal-cooling bed line for performing a removal process for removing the volatile organic compounds absorbed to the module and a cooling process for cooling the module that has undergone the removal process is provided on the other side of the moving-bed chamber,
   wherein the absorption bed line has an absorption chamber for performing the absorption process by absorbing the volatile organic compounds to the module and the removal-cooling bed line has a removal chamber for performing the removal process and a cooling chamber 1' for performing the cooling process, a first module chamber is provided between the absorption chamber and the removal chamber, and a second module chamber is provided between the cooling chamber and the absorption chamber,
   wherein a gate is installed between the absorption bed line and the first module chamber, a gate is provided between the first module chamber and the removal chamber, gates are provided between the removal chamber and the cooling chamber, a gate is provided between the cooling chamber and the second module chamber, and a gate is provided between the second module chamber and the absorption bed line.

8. A continuous concentration system for volatile organic compounds for concentrating volatile organic compounds that undergo an absorption process and a removal process, the continuous concentration system comprising:
   a moving-bed chamber in which modules for absorbing volatile organic compounds are contained,
   wherein an absorption bed line to which the volatile organic compounds are supplied to be absorbed to the module is provided on one side of the moving-bed chamber, and
   a removal-cooling bed line for performing a removal process for removing the volatile organic compounds absorbed to the module and a cooling process for cooling the module that has undergone the removal process is provided on the other side of the moving-bed chamber,
   wherein the absorption bed line has an absorption chamber for performing the absorption process by absorbing the volatile organic compounds to the module and the removal-cooling bed line has a removal chamber for performing the removal process and a cooling chamber 1' for performing the cooling process, a first module chamber is provided between the absorption chamber and the removal chamber, and a second module chamber is provided between the cooling chamber and the absorption chamber,
   wherein the moving-bed chamber includes: an actuator for moving the module located in the absorption bed line into the first module chamber, an actuator for moving the module located in the first module chamber into the removal chamber, an actuator for moving the module located in the removal chamber into the cooling chamber, an actuator for moving the module located in the cooling chamber into the second module chamber, an actuator for moving the module located in the second module chamber to the absorption bed line, and an actuator for moving the module located in the absorption bed line.

* * * * *